United States Patent [19]

Hughes et al.

[11] Patent Number: 4,786,704

[45] Date of Patent: Nov. 22, 1988

[54] POLYUREA DISPERSIONS IN ORGANIC ISOCYANATES

[75] Inventors: Jeffrey Hughes, Manchester; John Hynds, Bury, both of England

[73] Assignee: Imperial Chemical Industries PLC, London, England

[21] Appl. No.: 832,344

[22] Filed: Feb. 24, 1986

Related U.S. Application Data

[62] Division of Ser. No. 530,679, Sep. 9, 1983, abandoned.

[30] Foreign Application Priority Data

Sep. 17, 1982 [GB] United Kingdom ................ 8226593

[51] Int. Cl.$^4$ ............................................. C08G 18/32
[52] U.S. Cl. ......................................... 528/65; 528/66
[58] Field of Search ................... 524/196; 528/65, 66; 521/159, 163

[56] References Cited

U.S. PATENT DOCUMENTS

| | | | |
|---|---|---|---|
| 3,903,126 | 9/1975 | Woerner et al. | 260/453 AB |
| 3,943,158 | 3/1976 | Dietrich et al. | 528/67 |
| 4,224,417 | 9/1980 | Hajak | 528/62 |
| 4,264,519 | 4/1981 | Hennig et al. | 260/453 |
| 4,320,067 | 3/1982 | Bonin et al. | 260/453 |
| 4,384,052 | 5/1983 | McBrayer et al. | 528/68 |
| 4,438,250 | 3/1984 | Grogler et al. | 528/66 |
| 4,590,226 | 5/1986 | Brown et al. | 521/174 |
| 4,631,298 | 12/1986 | Presswood | 521/163 |

FOREIGN PATENT DOCUMENTS 0033458 4/1983 European Pat. Off. .
1501172 2/1978 United Kingdom .

*Primary Examiner*—Veronica P. Hoke
*Attorney, Agent, or Firm*—Cushman, Darby & Cushman

[57] ABSTRACT

A dispersion of a polyurea in an aromatic polyisocyanate is prepared by mixing the polyisocyanate with one or more aliphatic diprimary diamines having (a) at least one amine group attached to a carbon atom having not more than one hydrogen atom attached thereto or (b) at least one amine group attached to a carbon atom which is itself attached to a carbon atom having not more than one hydrogen atom attached thereto, provided that both amine groups are not attached directly to separate rings of an alkylene-linked polycyclic aliphatic ring system. The reaction preferably takes place at a temperature in the range 20° C. to 60° C. The polyurea dispersion products are useful for manufacture of polyurethane foams and elastomers of superior physical properties.

9 Claims, No Drawings

POLYUREA DISPERSIONS IN ORGANIC ISOCYANATES

This is a division of application Ser. No. 530,679, filed Sept. 9, 1983 now abandoned.

This invention relates to organic isocyanates and in particular to dispersions of polyureas in organic isocyanates.

The production of materials such as polyurethanes foams and elastomers from organic isocyanates is well known. The physical properties of such materials may be improved if a finely divided particulate material is dispersed throughout the body of the foam or elastomer.

Several methods have been proposed for the introduction of organic or inorganic filters into polyurethane foams with a view to providing improved properties such as greater hardness.

In U.K. Pat. No. 1,501,172 there is described a process for the production of a polyurethane foam which comprises reacting a polyisocyanate with a dispersion of a polyurea (and/or at least one polyhydrazicarbonamide) in a compound containing at least two hydroxyl groups and having a molecular weight of from 200 to 1600 (for example a high molecular weight polyether) in the presence of a blowing agent. The polyurea dispersion is formed by the reaction of a polyamine with an isocyanate in the presence of the high molecular weight polyether dispersant medium. A number of polyamines are disclosed as being suitable for the reaction of which the simplest is ethylene diamine. The presence of the high molecular weight polyether dispersant medium is essential to modify the reaction of the polyamine with the isocyanate.

The problem of the vigour of the reaction of conventional diamines such as ethylene diamine with isocyanates is discussed in U.S. Pat. No. 4,320,067 where it is noted that when a commercial polyisocyanate such as tolylene diisocyanate-isomeric mixture is mixed with commercial ethylene diamine, the "expected vigorous, almost uncontrollable reaction takes place". The patent suggests the formation of modified polyisocyanates by the reaction of the isocyanate with (a) a polyamine containing more than three non-aromatically bound, basic nitrogen atoms, of which at least two are primary and/or secondary amino nitrogen atoms or (b) a polyamine mixture which contains an average of more than three non-aromatically bound, basic nitrogen atoms, of which at least two are primary and/or secondary amino nitrogen atoms.

In U.S. Pat. No. 4,264,519 there is once more considerable discussion of the problems encountered as a result of the high reactivity of organic polyisocyanates with conventional low molecular weight organic polyamines in the production of solutions or dispersions of ureas and biurets. In this patent, the problem is solved by the use of a special reaction vessel into which the reactants are injected under pressure and in a carefully defined manner.

In U.S. Pat. No. 3,943,158 there are disclosed stable homogeneous solutions of urea diisocyanates formed by the reaction of organic diisocyanates with secondary diamines of defined formula.

We have now found that, surprisingly, stable polyrea dispersions may be obtained without the need for complex mixing vessels or techniques by the reaction of certain defined primary diamines with aromatic isocyanates.

According to the present invention there is provided a process for the manufacture of a dispersion in an aromatic polyisocyanate of a polyurea which comprises reacting by simple mixing the polyisocyanate with one or more aliphatic diprimary diamines having (a) at least one amine group attached to a carbon atom having not more than one hydrogen atom attached thereto or (b) at least one amino group attached to a carbon atom which is itself attached to a carbon atom having not more than one hydrogen atom attached thereto, provided that both amine groups are not attached directly to separate rings of an alkylene-linked polycyclic aliphatic ring system.

Thus for example there is excluded from the present invention by the above proviso diamino-dicyclohexylmethane and derivatives thereof wherein the two amine groups are respectively attached directly to the separate cyclohexyl rings The term "simple mixing" as used herein means mixing in a conventional mixing vessel using conventional mixing means such as stirring with a conventional stirrer or high-shear stirrer such as a SILVERSON (trade mark) stirrer.

Preferably the aliphatic diprimary diamine has both amine groups attached either to a carbon atom having not more than one hydrogen atoms attached thereto or to a carbon atom which is itself attached to a carbon atom having not more than one hydrogen atom attached thereto, provided that both amine groups are not attached directly to separate rings of an aliphatic ring system. Thus we have found for example that trimethylhexamethylene diamine (1,6-diamino-2,2,4-trimethylhexane)—in which only one of the two amine groups is attached to a carbon atom which is itself attached to a carbon atom having no hydrogen atoms attached thereto—gives satisfactory polyurea dispersions when mixed with tolylene diisocyanate, but has a tendency to form inferior dispersions with a degree of gelling when using isocyanates based on diphenylmethane diisocyanates.

Especially preferred diamines are diamine derivatives of aliphatic cyclic ring systems, for example six membered ring systems and derivatives thereof, or fused polycyclic ring systems, for example the tricyclodecane fused ring system and derivatives thereof. Examples of especially preferred diamines are isophorone diamine (3-aminomethyl-3,5,5-trimethylcyclohexylamine), and p-methane diamine (1-methyl-4-(2-methyl-2-aminoethyl)cyclohexylamine).

Mixtures of two or more diamines may be used if desired

The aromatic polyisocyanate may be any of the aromatic isocyanates known in the art to be useful for the formation of polyurethane derivatives such as polyurethane foams and elatomers. The term "polyisocyanate" as used herein includes a diisocyanate. Of particular interest are for example tolylene diisocyanate and especially diphenylmethane diisocyanates (MDI) which are commercially available in a variety of forms. Suitable diphenylmethane isocyanates include (a) diphenylmethane-4,4'-diisocyanate and mixtures thereof with other isomers of diphenylmethane diisocyanate;

(b) methylene bridged polyphenylpolyisocyanates prepared by phosgenation of mixtures of polyamines obtained by the condensation of aniline and formaldehyde and known in the art as "crude" or "polymeric" MDI;

(c) isocyanate ended polymers and oligomers obtained by reacting diphenylmethane diisocyanates or "crude MDI" with a monomeric glycol or polyol (or mixtures thereof) or with a hydroxyl-ended polyester or polyether and known in the art as "MDI prepolymers"; and (d) modified diphenylmethane diisocyanates or "modified crude MDI" which are compositions in which a proportion of the isocyanate groups are converted into other functional groups such as carbodiimide, uretonimine or allophanate groups, or in which a proportion of the isocyanate groups are reacted with an isocyanate-reactive compound.

Mixtures of MDI variants may also be used if desired.

The polyurea dispersion may be formed by adding the diamine to the organic isocyanate over a period of time whilst stirring the mixture. As discussed above, there is no need to employ complex mixing techniques or apparatus such as that described in U.S. Pat. No. 4,264,519. The reaction conveniently takes place at ambient temperature, although higher or lower temperatures may be used if desired. The temperature should not be sufficiently high to convert the dispersed polyurea particles into the corresponding biuret, and it is preferred that the temperature remains below 90° C. Temperatures in the range of 20° C. to 60° C. are preferred.

Preferably the diamine is a liquid and is added to the organic isocyanate in that form. If a solid diamine is used, it may be added in the form of a solution in a suitable solvent.

If the polyurea is to be formed from a modified diphenylmethane isocyanate, the diamine may if desired be added during the formation of the modified MDI. Thus if a modified MDI is to be formed by the reaction of a diphenylmethane diisocyanate with for example a mixture of monomeric glycols, the diamine may be added before or after the reaction of the diphenylmethane diisocyanate with the glycols, or the diamine may be added at an intermediate stage after the reaction of the diphenylmethane diisocyanate with a portion of the glycols, the remainder of the glycols being added after the diamine.

We have found that the present invention provides stable, mobile dispersions which are suitable for preparing polyurethane products of superior physical properties. The expression "stable" dispersion as used herein is not to be taken to imply that the dispersion obtained is indefinitely stable under all conditions. It is sufficient if the dispersion remains workable for a reasonable period of time having regard for its use in the preparation of polyurethane products. Equally, the settling of a minor proportion of the dispersed phase is not necessarily deleterious, provided that a good dispersion may be reformed on gentle stirring.

The term "polyurea" as used herein includes a diurea formed by the reaction of the diamine with two molecules aromatic isocyanate, one isocyanate group in the aromatic isocyanate reacting with each amine group. Thus, for example one mole of diamine reacts with two molecules of an aromatic diisocyanate to form the diurea. Whilst the scope of the present invention is not to be taken to be limited by any particular theory, it is believed that a major proportion of the "polyurea" may be a diurea with a minor proportion being higher polyaddition products. For convenience, the "calculated polyurea content" of the dispersion, as that expression is used herein, is calculated on the basis of the reaction of one molecule of diamine with two molecules of aromatic isocyanate. The calculated polyurea content of the dispersion may be up to 50 percent by weight of the total isocyanate composition, but is preferably not greater than 25 percent by weight of the total isocyanate composition, for example from 3 to 25 percent by weight of the total isocyanate composition.

The present invention includes the manufacture of polyurethane products, for example polyurethane foams and elastomers, in known manner from the dispersion of a urea in an organic polyisocyanate described above, and also includes polyurethane products so prepared.

Polyurethane products are made by reacting a polyisocyanate with a polyol. The urea/polyisocyanate dispersions of the present invention may be used in the same manner as conventional polyisocyanates. The nature of the polyurethane product, for example the polyurethane foam may be varied depending on the exact isocyanate and a variety of other factors as is conventional in the art.

Other conventional ingredients may be used in making the polyurethanes. These include catalysts, for example tertiary amines and organic tin compounds, surfactants, cross linking or chain lengthening agents, for example, low molecular weight diols, triols and diamines, flame proofing agents, for example, halogenated alkyl phosphates, fillers and pigments. Blowing agents used for forming polyurethane foams include water, which reacts with the polyisocyanate to form carbon dioxide, and inert low boiling liquids such as halogenated hydrocarbons.

If desired, the dispersion of the polyurea in the aromatic isocyanate according to the present invention may be used in conjunction with a polyol which itself contains a particulate dispersion, for example a polyol dispersion such as that described in U.K. Pat. No. 1,501,172.

The invention is illustrated by the following Examples in which all parts and percentages are by weight unless otherwise stated.

EXAMPLE 1

Isophoronediamine (16 g) was added dropwise with rapid stirring at room temperature over a period of half an hour to 400 g of a liquid uretonimine-modified 4,4'-diphenylmethane diisocyanate having an isocyanate value of 29.2%. The mixture was stirred for a further hour at room temperature after the amine addition was complete, and a stable white mobile dispersion was obtained. The dispersion had an isocyanate value of 25.3% (calculated 25.9%). The infrared spectrum showed strong bands characteristic of a polyurea based on 4,4'-diphenylmethane diisocyanate.

The calculated polyurea content of the dispersion was 15.1%.

EXAMPLE 2 p-Menthanediamine (10 g) was added dropwise with rapid stirring at room temperature over a period of half an hour to 200 g of a mixed glycol prepolymer/uretonimine-modified 4,4'-diphenylmethane diisocyanate of isocyanate value 26.0%. The mixture was stirred for a further half hour at room temperature to form a stable, creamy white mobile dispersion having an isocyanate value of 22.03% (calculated 22.1%). The infrared spectrum showed strong bands characteristic of a polyurea based on 4,4'-diphenylmethane diisocyanate.

The calculated polyurea content of the dispersion was 18.7%.

EXAMPLE 3

3(4),8(9)-Bis(aminomethyl)tricyclodecane (20 g) was added dropwise with rapid stirrung at room temperature over a period of 15 minutes to 200 g of a liquid uretonimine modified 4,4'-diphenylmethanediisocyanate having an isocyanate value of 29.2%. The mixture was stirred for a further 30 minutes at room temperature after the amine addition was complete and a stable, mobile, white dispersion was obtained. The dispersion had an isocyanate value of 21.8% (calculated 22.4%).

The calculated polyurea content of the dispersion was 32.5%.

EXAMPLE 4

2,2,4,4-tetramethyl-1,3-diaminocyclobutane (5 g) was added dropwise at room temperature with rapid stirring to 100 g of a liquid uretonimine-modified 4,4'-diphenylmethanediisocyanate having an isocyanate value of 29.2%. The addition took place over the period of 15 minutes. The mixture was then stirred for a further 30 minutes at room temperature, and a stable, mobile, white dispersion was obtained which had an isocyanate value of 24.0% (calculated 23.4%) and a calculated polyurea content of 21.5%.

EXAMPLE 5

1,4-Di(aminomethyl)cyclohexane (2.5 g) was added dropwise at room temperature with rapid stirring to 100 g of a liquid uretonimine-modified 4,4'-diphenylmethanediisocyanate having an isocyanate value of 29.2%. The addition took place over the period of 10 minutes. The mixture was then stirred for a further 30 minutes at room temperature, and a stable, mobile, white dispersion was obtained which had an isocyanate value of 27.1% (calculated 26.4%) and a calculated polyurea content of 5.5%.

EXAMPLE 6

Isophorone diamine (3.28 g) was added dropwise at room temperature with rapid stirring to 100 g of tolylene diisocyanate having an isomer ratio of 2,4' to 2,6' isomer of 80:20. The addition took place over a period of 10 minutes, and the mixture was then stirred for a further half hour at room temperature. A stable mobile white dispersion was obtained which had an isocyanate value of 44.4% (after storage for one day) and a calculated poly urea content of 10%.

EXAMPLE 7

The process of Example 6 was repeated except that 6.56 g of isophorone diamine was used to give an stable dispersion having an isocyanate value of 40.2% and a calculated urea content of 20%.

EXAMPLE 8

The process of Example 6 was repeated except that instead of isophorone diamine there was used 3.12 g of trimethylhexamethylene diamine. The product was a stable mobile white dispersion having an isocyanate value of 44.1% and a calculated urea content of 10%.

EXAMPLE 9

A polyurea dispersion was prepared using a liquid diphenylmethane diisocyanate composition in which a proportion of the isocyanate groups are reacted with a mixture of three alkylene glycols as described in U.K. Pat. No. 1596469. The liquid diphenylmethane diisocyanate composition described in this patent is especially useful for the manufacture of micro-cellular elastomers as used for example in shoe soles.

A comparison was made between a micro-cellular shoe soling elastomer prepared using a liquid diphenylmethane diisocyanate composition containing a polyurea dispersion according to the present invention and an exactly corresponding liquid diphenyl methane diisocyanate composition containing no polyurea dispersion. To ensure that the two compositions were truly comparable, the polyurea dispersion was made such that a proportion of the glycol mixture was replaced by the diamine so that the resultant composition had the same isocyanate value as the liquid diphenylmethane composition containing no polyurea dispersion.

Manufacture of Polyurea Dispersion

The diamine was added at an intermediate stage in the modification of 4,4'-diphenylmethane diisocyanate (4,4'-MDI) by reaction with a mixture of three glycols as described in U.K. Pat. No. 1596569.

Thus 250 g (1.99 moles) of the glycols was added dropwise with rapid stirring over a period of 30 minutes to 4987 g (19.93 moles) of pure 4,4'-MDI held at 60° C. The mixture was stirred for a further 30 minutes at 60° C., and then 286 g (1.68 moles) of isophorone diamine was added dropwise over a period of 75 minutes. The mixture was stirred for a further 30 minutes, and then 49 g (0.39 moles) of glycol mixture was added over a period of 5 minutes and the reaction mixture maintained at 60° C. for a further 100 minutes.

The resulting stable dispersion had an isocyanate value of 23.3% and a viscosity of 420 cp at 25° C. The calculated polyurea content was 19.8%. A slight settling of the dispersed phase was observed after 24 hours, but the stable dispersion was readily reformed on gentle stirring.

EXAMPLE 10

Manufacture of the Shoe Soling Material

The polyurea dispersion of Example 9 was used to prepare an elastomer of the type used in shoe soling. A comparison was made with a corresponding glycol modified pure 4,4'-MDI not containing the polyurea dispersion but having a corresponding NCO value (23.0%). The microcellular elastomer was made in conventional manner using the following foaming mixture:

| | |
|---|---|
| Polyether polyol of hydroxyl value 35 mg KOH/g | 84 parts |
| Chain extender | 9 parts |
| DABCO | 0.4 parts |
| Tin catalyst | 0.02 parts |
| water | 0.2 parts |
| fluorocarbon blowing agent | 6.0 parts |
| Glycol modified 4,4'-MDI (Example 9/comparison) | 48 parts |

The properties of the elastomer obtained using the polyurea dispersion of Example 9 and the comparison containing no polyurea dispersion respectively are given below:

| Elastomer Property | Modified MDI of Ex. 9 | Comparison |
|---|---|---|
| Density (Kg/m$^3$) | 625 | 615 |
| Shore A hardness | 79 | 65 |
| Tensile strength (MN/m$^2$) | 5.1 | 4.6 |
| Elongation (%) | 320 | 355 |
| Tear strength (KN/m) | 15.9 | 12.9 |

The comparison demonstrates the increased elastomer hardness obtained using the polyurea dispersion according to the present invention.

EXAMPLE 11

231.9 g (1.36 moles) of isophorone diamine was added dropwise with rapid stirring to 5172.7 g (17.00 moles) of a liquid uretonimine modified 4,4'-diphenylmethane diisocyanate (4,4'-MDI) having an NCO value of 29.2%. The addition took place over a period of 65 minutes, and the temperature was maintained at 20° C. The mixture was stirred for a further 240 minutes at a temperature of 20° C.

The resulting stable mobile white dispersion had a viscosity of 460 cp at 25° C. and an NCO value of 25.85%. The calculated polyurea content was 19.65%.

Some settling of the dispersed phase was observed after 72 hours, but a stable dispersion was readily reformed on gentle stirring.

EXAMPLE 12

The polyurea dispersion of Example 11 was used to prepare an elastomer of the type used in automotive applications such as bumpers. A comparison elastomer was also prepared using a corresponding 4,4'-MDI composition which contained no polyurea dispersion. To ensure that the MDI samples with and without the polyurea dispersion were strictly comparable, there was used for the comparison a mixed glycol/uretonimine modified 4,4'-MDI having the same NCO value as the uretonimine modified 4,4'-MDI containing the polyurea dispersion.

A conventional foaming mixture was used as follows:

| | |
|---|---|
| Polyether polyol of hydroxyl value 35 mg KOH/g | 80 parts |
| Chain extender | 20 parts |
| DABCO | 0.4 parts |
| Tin catalyst | 0.01 parts |
| MDI/Polyurea dispersion of Example 11 (or comparison MDI compositon) | 59 parts |

The properties of the resultant elastomers were as follows:

| Property | Polyurea Dispersion of Ex. 11 | Comparison |
|---|---|---|
| Density (kg/m$^3$) | 900 | 950 |
| Hardness (Shore D) | 63 | 59 |
| Tensile strength (MN/m$^2$) | 20.5 | 20.6 |
| Elongation at break (%) | 120 | 140 |
| Flexural Modulus (MPa) | 430 | 340 |

The results show the increased hardness and stiffness obtained when using the polyurea dispersion according to the present invention.

EXAMPLE 13

Isophorone diamine (187.8 g–1.10 moles) was added dropwise with rapid stirring to 4822.7 g (13.00 moles) of polymeric (crude) MDI-diisocyanate diphenylmethane containing higher functionality polyisocyanates. The addition took place over a period of 55 minutes during which time the temperature rose from the initial 22° C. to 29° C. The mixture was then stirred for another 65 minutes at 25° C.

The resulting thixotropic dispersion had a viscosity of 2797 cp at 25° C. and an NCO value of 27.34%. The calculated polyurea content was 20.11%. No settling of the dipsersed phase was detected after standing for a week.

EXAMPLE 14

3(4),8(9)-Bis(aminomethyl)tricyclodecane (140.1 g–0.72 moles) was added dropwise with rapid stirring to 2503 g (10.00 moles) of Diphenyl methane diisocyanate (mainly 4,4' isomer with a small percentate of the 2,4' isomer). The addition took place over a period of 95 minutes and the temperaure was held at 45° C. The mixture was then stirred for a further 80 minutes.

Polyether glycol (1000.8 g–0.50 moles) was added dropwise to the reaction mixture over a period of 30 minutes at a temperature of 55° C. and the mixture was maintained at 80° C. for a further 120 minutes. The mixture was cooled to 50° C. and blended with 1298.8 g (3.50 moles) of polymeric (crude) MDI and the mixture was stirred for a further 30 minutes.

The resulting stable dispersion had an isocyanate value of 21.87% and a viscosity of 538 cP at 25° C. The calculated polyurea content was 10.14%.

There was no evidence of any settling of the dispersed phase after the dispersion had been standing for a week.

EXAMPLE 15

The polyurea dispersion of Example 14 was used to prepare a flexible foam moulding using a conventional formulation and was compared with a corresponding isocyanate which di not contain the polyurea dispersion.

The comparison isocyanate was prepared in exactly the same manner as that of Example 14 and used the same quantities of reactants except that no tricyclo-decane diamine was added. No attempt was made to compensate for the isocyanate value which would have reacted with the diamine and in consequence the isocyanate value of the resultant composition was higher (24.3%) than that of the polyurea dispersion of Example 14. In this instance therefore, the proportion of the comparison isocyanate used in the form formulation was reduced proportionately so that strictly comparable foams were produced.

The foam formulation used was as follows:

| | Example 9 | Comparison |
|---|---|---|
| Polyether polyol of hydroxyl value 35 mg KOH/g | 84.55 parts | 84.55 parts |
| Water | 2.8 parts | 2.8 parts |
| Amine catalyst system (based on DABCO) | 1.56 parts | 1.56 parts |
| Silicone surfactant | 0.93 parts | 0.93 parts |

-continued

|  | Example 9 | Comparison |
|---|---|---|
| Fluorocarbon blowing agent | 10.2 parts | 10.2 parts |
| Polyurea dispersion of Example 9 (or comparison isocyanate) | 71.6 parts | 65.0 parts |

Flexible foam mouldings having the following properties were obtained:

| Property |  | Example 9 | Comparison |
|---|---|---|---|
| Density (Kg/m$^3$) |  | 51.3 | 51.6 |
| Indentation hardness (Kg) | 25% | 26 | 22.5 |
|  | 40% | 37 | 30 |
|  | 50% | 48 | 38 |
|  | 65% | 83 | 59 |

The comparison shows the improved foam hardness obtained using the polyurea dispersion according to the present invention.

COMPARISON A

The procedure of Example 1 was repeated using ethylene diamine in place of the isophorone diamine. There was a vigorous reaction with the formation of a flocculant precipitate. No stable dispersion was obtained.

COMPARISON B

The procedure of Example 1 was repeated using hexamethylene diamine in place of the isophorone diamine. There was a vigorous reaction with the formation of a flocculant precipitate. No stable dispersion was obtained.

What is claimed is:

1. A process for the manufacture of polyurethane elastomers which comprises reacting a polyol with a dispersion of a polyurea in an aromatic polyisocyanate, said dispersion having been prepared by a process which comprises reacting by simple mixing at a temperature below 90° C. an aromatic polyisocyanate with one or more aliphatic or alicyclic diprimary amines having (a) at least one amine group attached to a carbon atom having not more than one hydrogen atom attached thereto or (b) at least one amine group attached to a carbon atom which is itself attached to a carbon atom having not more than one hydrogen atom attached thereto, provided that both amine groups are not attached directly to separate rings of an alkylene-linked polycyclic aliphatic ring system.

2. A process according to claim 1 wherein the diamine has both amine groups attached either to a carbon atom having not more than one hydrogen atom attached thereto or to a carbon atom which is itself attached to a carbon atom having not more than one hydrogen atom attached thereto, provided that both amine groups are not attached directly to separate rings of an alkylene-linked polycyclic aliphatic ring system.

3. A process according to claim 1 or claim 2 wherein the diamine is a diamine derivative of an aliphatic six membered ring.

4. A process according to claim 3 wherein the diamine is isophorone diamine, p-menthane diamine or 1,4-di(aminomethyl)cyclohexane.

5. A process according to claim 1 or 2 wherein the diamine is 3(4),8(9),-bis(aminomethyl)tricyclodecane or 2,2,4,4-tetramethyl-1,3-diaminocyclobutane.

6. A process according to claim 1 wherein the aromatic polyisocyanate is tolylene diisocyanate or a diphenylmethane diisocyanate.

7. A process according to claim 1 wherein the reaction takes place at a temperature in the range 20° C. to 60° C.

8. A process according to claim 1 wherein the calculated polyurea content is not greater than 50% by weight of the total isocyanate composition.

9. A process according to claim 8 wherein the calculated polyurea content is from 3 to 25% by weight of the total isocyanate composition.

* * * * *